United States Patent
Edsall et al.

(10) Patent No.: US 6,741,592 B1
(45) Date of Patent: May 25, 2004

(54) PRIVATE VLANS

(75) Inventors: Thomas J. Edsall, Cupertino, CA (US); Marco Foschiano, San Jose, CA (US); Michael Fine, San Francisco, CA (US); Thomas Nosella, Sunnyvale, CA (US)

(73) Assignee: Cisco Technology, Inc., San Jose, CA (US)

( * ) Notice: Subject to any disclaimer, the term of this patent is extended or adjusted under 35 U.S.C. 154(b) by 0 days.

(21) Appl. No.: 09/575,774

(22) Filed: May 22, 2000

(51) Int. Cl.[7] .................. G06F 15/173; H04L 12/56
(52) U.S. Cl. .................. 370/389; 370/401; 709/225
(58) Field of Search .................. 370/389, 392, 370/401, 464, 465; 709/218, 221, 225

(56) References Cited

U.S. PATENT DOCUMENTS

| | | | | |
|---|---|---|---|---|
| 5,959,989 A | * | 9/1999 | Gleeson et al. | 370/390 |
| 6,058,429 A | * | 5/2000 | Ames et al. | 709/242 |
| 6,111,876 A | * | 8/2000 | Frantz et al. | 370/392 |
| 6,147,995 A | * | 11/2000 | Dobbins et al. | 370/392 |
| 6,208,649 B1 | | 3/2001 | Kloth | |
| 6,304,901 B1 | | 10/2001 | McCloghrie et al. | |
| 6,560,236 B1 | * | 5/2003 | Varghese et al. | 370/401 |

OTHER PUBLICATIONS

Andrew Tanenbaum, "Computer Netwroks, Third Edition," Pretice Hall, 1996, pp. 417–419.

* cited by examiner

Primary Examiner—Alpus H. Hsu
Assistant Examiner—Toan Nguyen
(74) Attorney, Agent, or Firm—Cesari and McKenna, LLP

(57) ABSTRACT

The invention uses a layer 2 switch (L2 switch), or bridge, to separate user's message traffic by use of Virtual Local Area Networks (VLANs) defined within the switch. Three new types of ports are defined, "promiscuous" ports "isolated" ports, and "community" ports. Three types of VLANs internal to the switch are defined, "primary" VLANs, "isolated" VLANs and "community" VLANs. The promiscuous ports are connected to layer 3 or layer 4 devices. Isolated ports and community ports are connected to individual user's servers, etc., and maintain traffic for each user separate from other users. The primary VLAN connects to all promiscuous ports, to all isolated ports, and to all community ports. The primary VLAN is a one way connection from promiscuous ports to isolated or community ports. An isolated VLAN connects to all promiscuous ports and to all isolated ports. The isolated VLAN is a one way connection from an isolated port to the promiscuous ports. A community VLAN is defined as connecting to a group of community ports, and also connecting to all of the promiscuous ports. The group of community ports is referred to as a "community" of community ports. A community VLAN is a one way connection from a community of ports to the promiscuous ports, but allows a packet received by one community port to be transmitted out of the switch, through the other community ports connected to that community VLAN.

26 Claims, 8 Drawing Sheets

| PRIMARY VLAN | SECONDARY VLANs | |
|---|---|---|
| 2 | 20 | ~560A |
| 2 | 21 | ~560B |
| 2 | 22 | ~560C |
| 2 | 23 | ~560D |
| 3 | 30 | ~570A |
| 3 | 31 | ~570B |
| 3 | 32 | ~570C |
| ⋮ | ⋮ | |

TRUNK TYPE PROMISCUOUS PORT VLAN MAPPING TABLE

FIG. 5A

| PORT No. | ISOLATED OR COMMUNITY VLAN |
|---|---|
|  |  |
| 712 | 716 |
|  |  |

ISOLATED OR COMMUNITY PORT ASSIGNMENT TABLE

FIG. 7

PRIVATE VLANS

BACKGROUND OF THE INVENTION

1. Field of the Invention

The invention relates to Virtual Local Area Networks (VLANs), and more particularly to the use of VLANs to establish separation between different users of a shared switch.

2. Background Information

It is today a common computer network engineering practice to separate packet traffic belonging to different users by use of a router, a Layer 3 (L3) device. Separation of users' traffic is accomplished by assigning each user to a different subnetwork (subnet). A subnet is identified by a unique L3 address. The router then transmits a particular user's packets out through a port assigned to that subnet. However, only a limited number of bits in the L3 address (for example IP address) are assigned to the subnet, and so only a limited number of subnets may be addressed by a particular router. Subnet design is described by Andrew Tanenbaum in his book *Computer Networks, Third Edition*, published by Prentice Hall, Copyright date 1996, all disclosures of which are incorporated herein by reference, particularly at pages 417–419. For example, if 6 bits are assigned to a subnet mask, then only 62 different subnets may be addressed (0 and 64 are reserved). Further, for every subnet assigned two addresses are wasted, for example the multicast and broadcast addresses.

As an example of many users of a switch who require that their message traffic be kept separate, an Internet service provider (ISP) may have many customers who want to connect to a server farm. Access to the ISP is through a router connected to a common external computer network, for example the worldwide Internet. The router must route each customer's traffic to that customer's local area network in such a manner as to maintain protection and privacy between the data of different customers. It is desirable for an ISP to prevent traffic originating from one customer's server from being received by another customer's server.

A second example of many users of a computer network who must have their traffic separated in order to guarantee privacy and protection is the use of a television cable Internet distribution system. Each home is assigned a separate subnet so that routers may route only a particular customer's message traffic to that customer. This subnet routing prevents, for example, one customer looking at another customer's message traffic by use of, for example, a network snifter.

A third example is a server farm, for example a multiclient backup service. Each client's message traffic arrives at a router. The router uses a subnet mask to keep the traffic of each client separate from the traffic of another client, as it routes the traffic to the client's backup server.

A limitation in the use of subnets, and subnet masks, in a multiclient environment is that there is only a limited number of subnets which can be defined from standard Layer 3 addresses. In modem computer network systems, this numerical limitation severely restricts the number of individual users who can be serviced, and also have their message traffic maintained separate. Further, the management of a large number of subnets by a network manager becomes burdensome, especially in the event that the network has thousands of customers whose packet traffic must be kept separate.

A better way to keep the message traffic of different users separate in a computer network is needed, particularly a method which can scale to a large number of users.

SUMMARY OF THE INVENTION

The invention uses a layer 2 switch (L2 switch), or bridge, to separate user's message traffic by use of Virtual Local Area Networks (VLANs) defined within the switch. Three new types of ports are defined, "promiscuous" ports, "isolated" ports, and "community" ports. Three types of VLANs internal to the switch are defined, "primary" VLANs, "isolated" VLANs and "community" VLANs.

The promiscuous ports are connected to layer 3 or layer 4 devices, for example routers which may in turn connect to the worldwide Internet, load balancers which also may connect to the worldwide Internet, administrative work stations such as used by network administrators, back up devices, etc. Isolated ports and community ports are connected to individual user's servers, etc., and maintain traffic for each user separate from other users.

Isolated ports and community ports exchange packets with the promiscuous ports by use of the VLANs internal to the switch. The difference between isolated and community ports is that an isolated port cannot transfer packets to another isolated port, however a community port has a designated number of community ports to which it can transfer packets.

A primary VLAN internal to the switch is defined as follows. The primary VLAN connects to all promiscuous ports, to all isolated ports, and to all community ports. The primary VLAN receives packets from outside of the switch arriving at any of the promiscuous ports, and transfers the packets to the isolated or community ports. However, an isolated or community port cannot receive traffic from the external LAN connected to it, and transfer the packets to the primary VLAN. The primary VLAN is a one way connection from promiscuous ports to isolated or community ports.

An isolated VLAN is defined as connecting to all promiscuous ports and connecting to all isolated ports. An isolated VLAN receives packets arriving from outside of the switch at an isolated port, and transfers the packets to the promiscuous ports. An isolated VLAN does not carry packets received by a promiscuous port from outside of the switch. Also, an isolated VLAN does not deliver any packets to another isolated port. The isolated VLAN is a one way connection from an isolated port to the promiscuous ports.

A community VLAN is defined as connecting to a group of community ports, and also connecting to all of the promiscuous ports. The group of community ports is referred to as a "community" of community ports. The community VLAN transfers a packet received from outside the switch at a community port to all of the promiscuous ports, and also transfers the packet to the other community ports attached to that community VLAN. A plurality of "communities" of community ports may be defined, and each community of ports has its own assigned community VLAN. A community VLAN cannot transfer packets received from outside of the switch at a promiscuous port. A community VLAN is a one way connection from a community of ports to the promiscuous ports, but allows a packet received by one community port to be transmitted out of the switch, through the other community ports connected to that community VLAN.

These new types of VLANs and ports are implemented, in part, by particular settings of the Color Blocking Logic (CBL) logic circuits used by normal ports of an L2 switch which supports VLANs, and also by use of assignment tables.

Traffic generated by different user's servers is kept separate from other user's servers, by each user having his own isolated port or community of community ports.

The VLANs defined in a first L2 switch chassis can be trunked to other L2 switch chassises using ordinary trunking technology, in order to increase the number of ports.

Alternatively, a single L2 switch, or a network of trunked L2 switches, may have its promiscuous ports divided into subsets. Each subset of promiscuous ports is then associated with its subset of isolated ports and community ports, along with the necessary VLANs.

Other and further aspects of the present invention will become apparent during the course of the following description and by reference to the accompanying drawings.

BRIEF DESCRIPTION OF THE DRAWINGS

Referring now to the drawings, in which like numerals represent like parts in the several views:

FIG. 5A is a Trunk Type Promiscuous Port VLAN Mapping Table, in accordance with the invention;

FIG. 7 is a port assignment table for an isolated or community port;

DETAILED DESCRIPTION OF AN ILLUSTRATIVE EMBODIMENT

Figure 1:
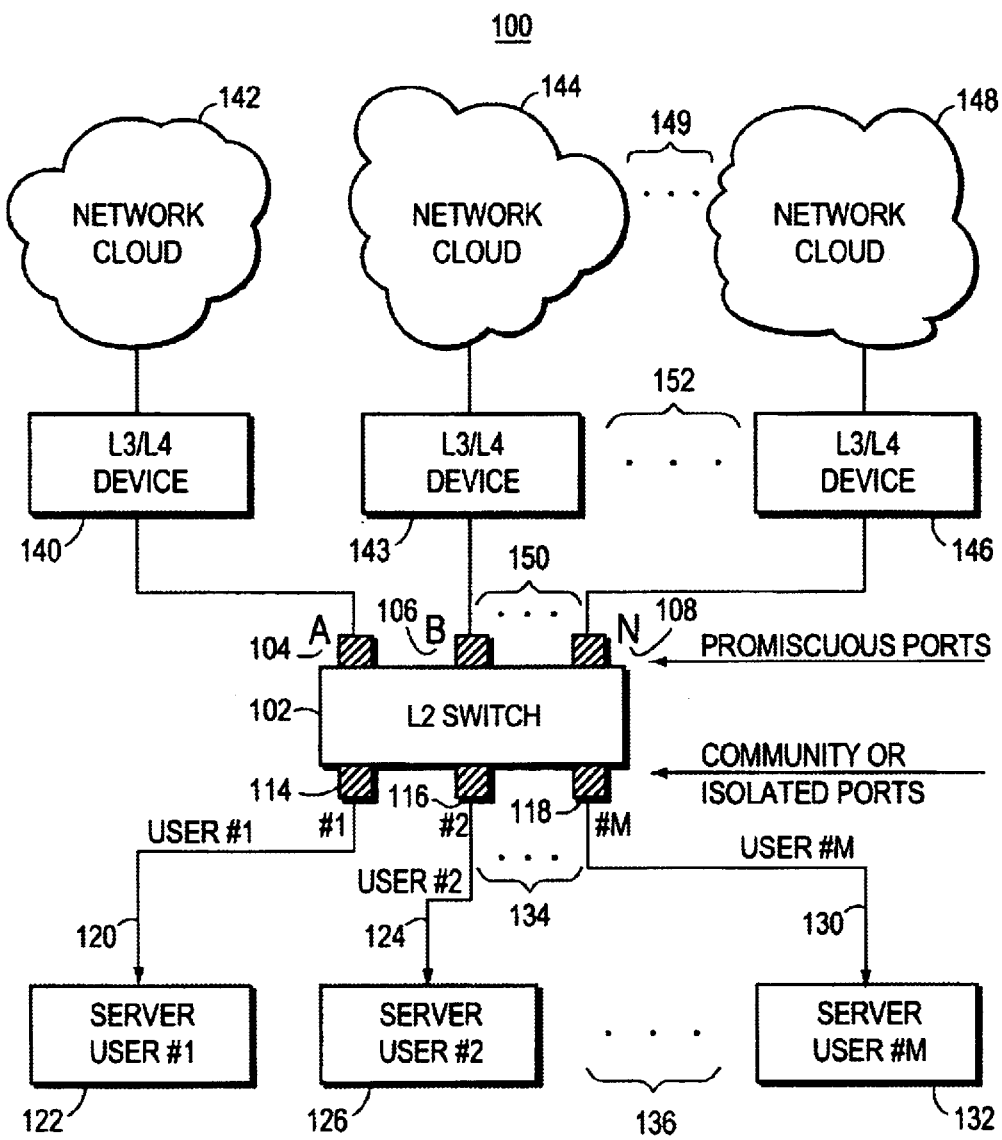
FIG. 1 is a block diagram of a computer network in accordance with the invention.

Turning now to FIG. 1, computer network 100 is shown.

L2 switch 102 has promiscuous ports, port A 104, port B 106, port N 108, etc. Promiscuous port 108 is indicated as "N", indicating that an arbitrary number of promiscuous ports may be employed by L2 switch 102.

L2 switch 102 also has isolated or community ports, port #1 114 is connected to user #1 VLAN 120, and user #1 VLAN 120 connects to user #1 server 122. Isolated or community port #2 116 connects to user #2 VLAN 124, and user #2 VLAN 124 connects to user #2 server 126. Isolated or community port #M 118 is labeled "M" to indicate that L2 switch 102 may have an arbitrary number of isolated or community ports. Isolated or community port #M 118 connects to user #M VLAN 130, and user #M VLAN 130 connects to user #M server 132. "Three dots" 134 indicate that L2 switch 102 may have a plurality of isolated or community ports, etc. "Three dots" 136 indicate that a plurality of user servers, each connected to a different isolated or community port, etc.

The promiscuous ports 104, 106, 108, etc. connect to layer 3 or layer 4 devices 140,143,146. Examples of layer 3 or layer 4 devices comprise routers, load balancers, administrative work stations, back-up devices, etc. An administrative work station is a work station utilized by a network administrator and permits the administrator to view all, or at least many, of the occurrences on the network. Promiscuous Port A 104 connects to layer 3 or layer 4 device (L3/L4 device) A 140, and L3/L4 device 140 connects to network cloud 142. Promiscuous port B 106 connects to L3/L4 device 143, and L3/L4 device 143 connects to network cloud 144. Promiscuous port N 108 connects to L3/L4 device 146. L3/L4 device 146 connects to network cloud 148.

Three dots 150 indicate that L2 switch 102 may have a plurality of promiscuous ports, etc. Three dots 152 indicate a plurality of L3/L4 devices, connected to the promiscuous ports, port A 104, port B 106, port N 108, etc. Three dots 149 indicate that the L3/L4 devices may connect to a plurality of network clouds 142, 144, 148, etc.

Network clouds 142, 144, 148 may be different network clouds, for example each may comprise a backup device for a particular user server. Alternatively, each network cloud 142, 144, 148 may represent the worldwide Internet. Further, each network cloud 142, 144, 148, may represent a particular device, may represent several particular devices, and may also represent the worldwide Internet, etc.

Figure 2:
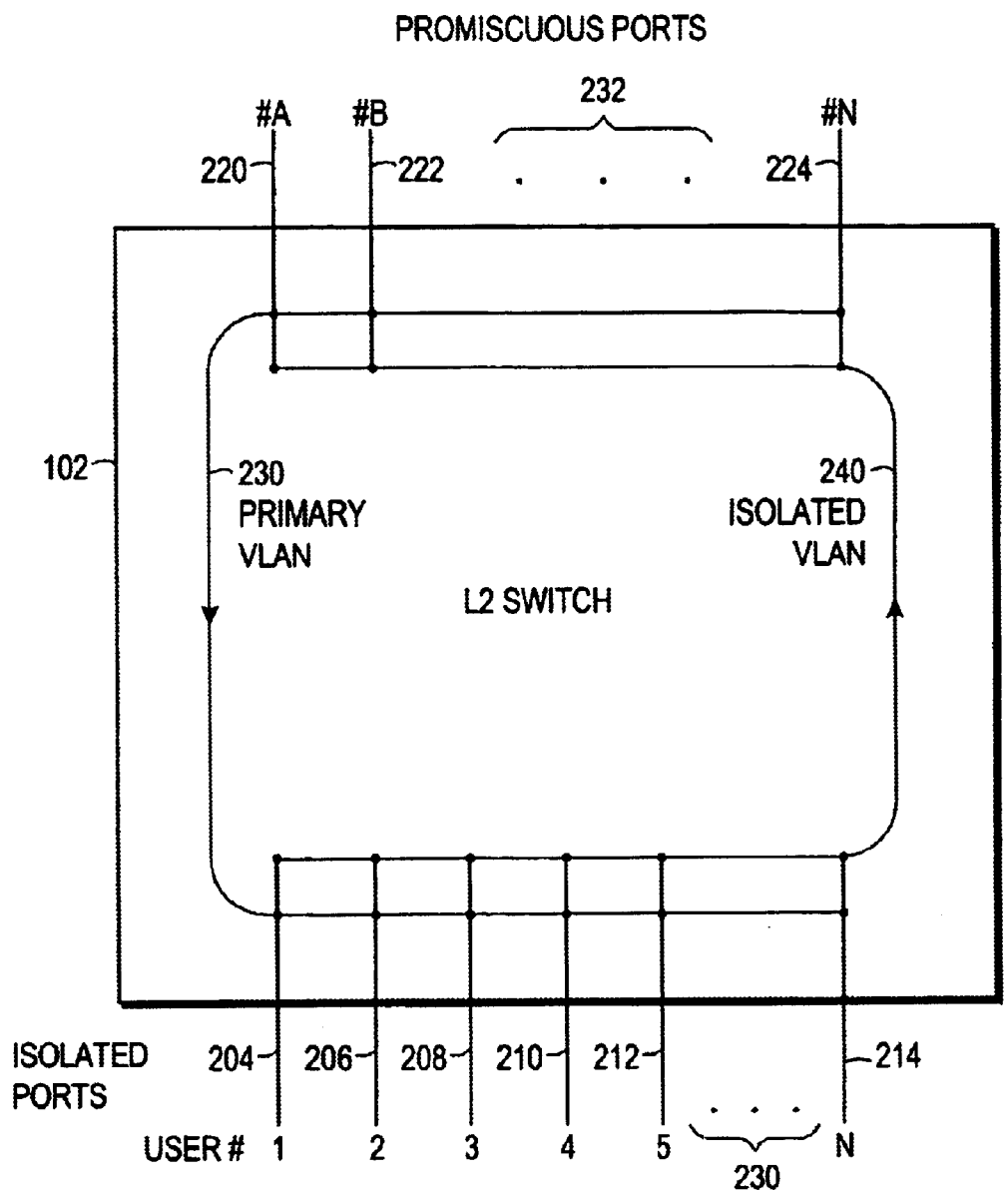
FIG. 2 is a block diagram of a L2 switch in accordance with the invention.

Turning now to FIG. 2, the interior of L2 switch 102 is shown. Isolated port 204, 206, 208, 210, 212, 214 are labeled progressively as user #1, 2, 3, 4, 5, N, etc., and each may connect to a different user. Isolated ports 204, 206, 208, etc. correspond to isolated ports 114, 116, 118, etc. shown in FIG. 1. Promiscuous ports, port A 220, port B 222, port N 224, connect to various L3/L4 devices (not shown in FIG. 2), such as devices 140, 143, 146, etc. Promiscuous ports 220, 222, 224, etc. correspond to promiscuous ports 104, 106, and 108, etc. as shown in FIG. 1.

Three dots 230 indicate a plurality of users, each connected to an isolated port 204, 206, 208, 210, 212, 214, etc. Three dots 232 indicate a plurality of promiscuous ports, 220, 222, 224, etc. and indicate that L2 switch 102 may have a plurality of promiscuous ports.

The VLANs utilized by L2 switch 102 are described below.

VLAN 230 is a primary VLAN, and connects to promiscuous ports 220, 222, 224, etc., and also connects to each of the isolated ports 204, 206, 208, . . . 214, etc. Primary VLAN 230 carries packet traffic from the promiscuous ports to isolated ports. Primary VLAN 230 is configured to reject any packets arriving at an isolated port from the external local area network connected to the isolated port.

During ordinary operation, any packet received by a promiscuous port from the L3/L4 device is transmitted on the primary VLAN, and may be received by any isolated port or community port having a destination for that packet on an external LAN connected thereto.

Isolated VLAN 240 connects to isolated ports 204, 206, 208, . . . 214, etc., and also connects to each of the promiscuous ports 224, 222, . . . 220, etc. Isolated VLAN 240 carries packet traffic from isolated ports to the promiscuous ports. Isolated VLAN 240 is configured to reject any traffic arriving from a promiscuous port. Also, isolated VLAN 240 is configured so that it cannot deliver any packets to an isolated port. That is, packets transferred onto isolated VLAN 240 by an isolated port cannot be received by another isolated port. Packets transferred onto isolated VLAN 240 from an isolated port are received by promiscuous ports 220, 222, 224, etc., and from the promiscuous ports may be transferred to network clouds, for example, network cloud 142, 144, 148.

Mechanisms, for example, color blocking logic (CBL) and assignment tables, may be used to permit primary VLAN 230 to transfer packets from promiscuous ports to isolated ports, and prohibit an isolated port from transmitting onto primary VLAN 230. Also, mechanisms within L2 switch 102 such as CBL and assignment tables may be used to permit isolated VLAN 240 to transfer packet traffic from an isolated port to a promiscuous port, and prevent isolated VLAN 240 from transferring a packet to an isolated port.

Community VLANs implemented in L2 switch 102 are described next.

A community VLAN connects to a designated group of community ports, and to all of the promiscuous ports. A community port receives a packet from outside of switch 102 and transfers the packet to the community VLAN. A packet transferred to the community VLAN from a community port is received by all of the community ports connected to the community VLAN, and also all of the promiscuous ports receive the packet from the community VLAN. The promiscuous ports then transfer the packet out of the L2 switch. A Community VLAN is configured to reject any traffic arriving from a promiscuous port.

Figure 3:
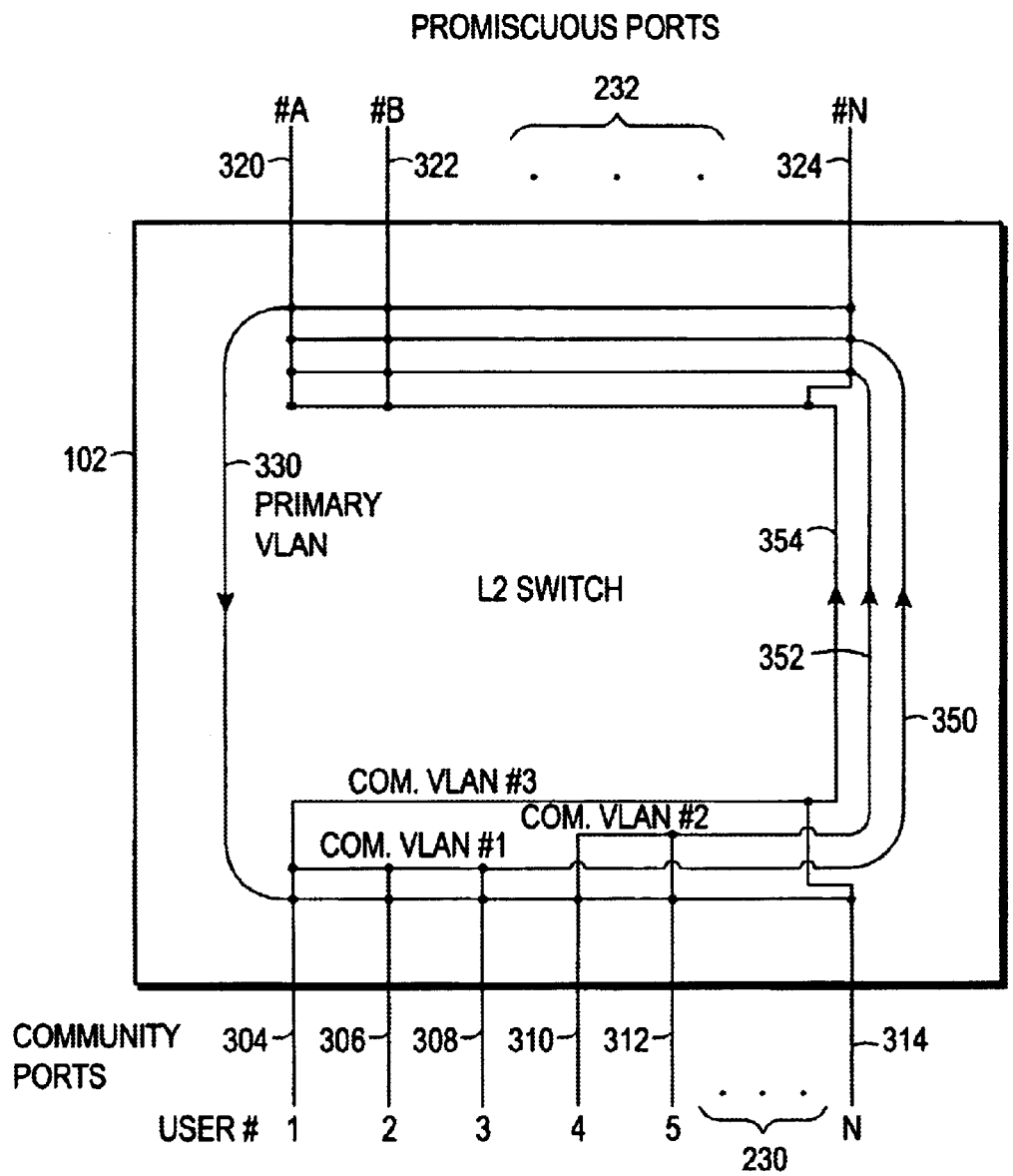
FIG. 3 is a block diagram of a L2 switch in accordance with the invention.

Turning now to FIG. 3, community VLAN #1 350, community VLAN #2 352, and, community VLAN #3 354 are shown. Community VLAN #1 350 is shown connected to community ports 306, and 308. Community VLAN #1 350 permits community ports connected thereto to exchange packets. For example, a packet entering L2 switch 102 from user #2 at community port 306 is transferred by community VLAN #2 350 to the other community ports, for example community ports 308, etc., connected to community VLAN #1 350, and is also transferred to all of the promiscuous ports, ports 320, 322, 324, . . .

Community VLAN #2 352 is shown connected to community port 310 and 312. A packet originating from user #4 or user #5 will enter L2 switch 102 at either community port 310, 312, respectively, and will be transferred by community VLAN #2 352 to the other isolated port, and to all of the promiscuous ports 320, 322, . . . 324, etc.

As a further example of a community VLAN, community VLAN #3 354 is shown. Community VLAN 354 is shown connected to community port 304 and community port 314. Community VLAN #3 354 also connects to all of the promiscuous ports 320, 322, . . . 324, etc.

In the present description, the isolated ports are shown in FIG. 2, and the community ports are shown in FIG. 3. Switch 102 may have, for example, both isolated ports and community ports. In this case, both of the port arrangements of FIG. 2 and of FIG. 3 are implemented within L2 switch 102. In a second exemplary embodiment, L2 switch 102 may have only isolated ports as shown in FIG. 2. In a third exemplary embodiment, L2 switch 102 may have only community ports as shown in FIG. 3.

A terminology which can be used is to refer to the isolated VLAN and the community VLAN as a "secondary" VLAN. Using this terminology, a primary VLAN takes packets from the promiscuous ports to either the isolated ports or the community ports. In contrast, the secondary VLAN takes packets from either the isolated ports or community ports to the promiscuous ports.

Figures 4, 5:
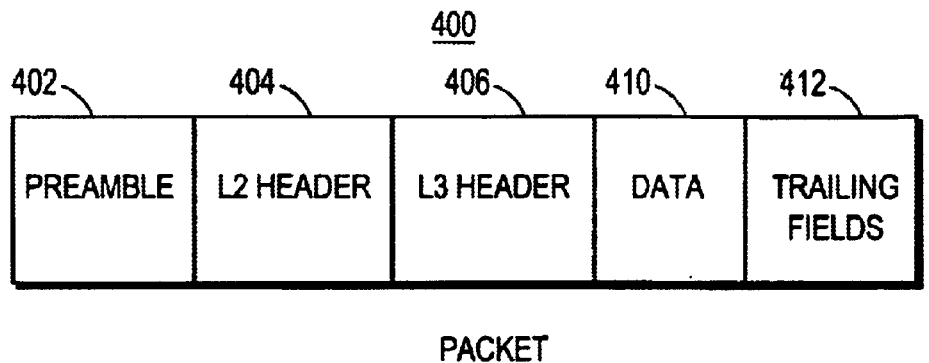
FIG. 4 is a field diagram of a layer 3 packet.
FIG. 5 is an assignment table for a promiscuous port for outgoing traffic, in accordance with the invention.

Turning now to FIG. 4, a field diagram 400 of a typical L2 packet which reaches an L2 switch from a network cloud is shown. Field 402 is the preamble. Field 404 contains the L2 header. Field 406 contains the L3 header. Data carried by packet 400 is in field 410. Trailing fields 412 contain fields typically trailing the data fields of a typical data packet, and normally include a cyclical redundancy check (CRC) field.

The field diagram of a packet shown in FIG. 4 also represents the fields in a packet departing from L3/L4 device 104, etc. to network cloud 142, or any of the other network clouds from one of the other L3/L4 devices.

Turning now to FIG. 5, "Promiscuous Port Assignment Table for Outgoing Traffic" 500 is shown with three columns. Table 500 is a conceptual table which is an aid to understanding the invention. Data shown in table 500 may be held, in a particular implementation, in a variety of places. For example some data is in the header of a received packet, some data may be held in hardware such as memory in an ASIC chip in the interface, or further, some of the data may be held in a software lookup table in the memory for a processor of the router. As a further example, an implementation may use a table such as Table 500 in main memory for a processor of the router. Column 502 contains a layer 3 interface number. Column 504 contains a primary VLAN assignment number. Column 506 contains an isolated or community VLAN assignment number.

A primary VLAN Assignment Number, as held in column 504, is a designation which is written into a field of a packet transferred from layer 2 switch 102 to L3/L4 device 140, or, for example, any of the other L3/L4 devices 143, 146, etc., using standard L2 switch to L3/L4 device protocol. For example, the Primary VLAN Number may be written into the L3 data field 410 as part of a Layer 4 (L4) header using a standard VLAN protocol. The receiving network device reads the primary VLAN number from the header, writes it into column 504, and makes a one-to-one correspondence with a layer 3 interface number (L3 Interface Number) which is written into column 502. Table 500 then may have multiple entries in column 506 for a many to one correspondence. That is, there may be many entries in column 506, one for the isolated VLAN, and one entry for each community VLAN associated with that primary VLAN.

Rows, for example, row 510 of promiscuous port assignment table 500 for outgoing traffic, contain an entry for each Layer 3 Interface Number. A Layer 3 Interface Number corresponds to a L3 destination address to which a Layer 3/Layer 4 (L3/L4) device 140, etc., transfers data packets in computer network 100.

In operation, a packet arrives at a promiscuous port on an isolated VLAN or a community VLAN for transmission out of L2 switch 102. A process enters Promiscuous Port Assignment Table for Outgoing Traffic 500 through either the isolated VLAN number or the community VLAN number, thereby obtaining the corresponding L3 Interface Number from column 502 of the entry. The Primary VLAN directs the packet from the L2 switch 102 to the proper L3/L4 device 140, etc., using a protocol for transfer of packets from a L2 switch to a L3/L4 device. The L3/L4 device then interprets the Primary VLAN and directs the packet to the appropriate destination address in Network Cloud 142, etc.

Alternatively, the Primary VLAN of the destination computer could be held in Column 504 of Promiscuous Port Assignment Table for Outgoing Traffic 500, and the packet transferred, for example by TCP/IP, from L2 switch 102 to the L3/L4 device.

In the conceptual table "Promiscuous Port Assignment Table for Outgoing Traffic", Table 500 there is a one-to-one correspondence between a Primary VLAN number and a L3 Interface number. An L3 Interface, designated by L3 Interface Number, is usually associated to a subnet, that is to a whole group of addresses. Once the packets reach an L3 Interface, then thy are normally routed by the router without any remaining knowledge of the Private VLANs. At the L3 Interface there is no distinction between normal traffic, and traffic coming from a private VLAN.

During operation, a packet such as network packet 400 shown in FIG. 4, is received by an L3/L4 device, for example, L3/L4 device 140, etc. from a network cloud, for example, network cloud 142. The received packet has the field structure as shown in fields 400 of FIG. 4. The network packet is transferred by the receiving L3/L4 device to L2 switch 102. L2 switch 102 receives the packet on a promiscuous port, for example, port 104, 106, . . . , 108. Upon receipt by a promiscuous port, the packet is transferred to primary VLAN 230, 330 as shown in FIG. 2 or FIG. 3 respectively. The packet then is transferred to each of the isolated ports 204, 206, 208 . . . 214, etc and community ports 304, . . . 314, etc. The packet is transmitted out of the appropriate isolated port or community port by the L2 switch 102 using standard forwarding mechanisms, for example by TCP/IP.

A typical entry for a Primary VLAN is shown at entry 510. Entry 510 shows the one-to-one correspondence between the L3 Interface Number held in field 512 and the Primary VLAN Number held in field 514. Associated with entry 510 are a plurality of entries for isolated or community VLANs, as shown in fields 516, 518, 520, and a possible extension to further "many" entries shown by "three dots" 522.

As an example, primary VLANs and secondary VLANs (that is Isolated or Community VLANs) are programmed in the router using Color Blocking Logic (CBL). A special value is programmed for all primary and secondary VLANs. For example, a value of "forwarding" as defined in the Spanning Tree Protocol Standard IEEE 802.1D may be used. This exemplary assignment allows the hardware to let all the traffic from those VLANs out of the port, and also to accept the ingress traffic for the primary VLANs.

In the event that the port needs to be able to map many-secondaries-to-one-primary only, this exemplary mapping method is sufficient to define the promiscuous port. A port having mapping of many-secondaries-to-one-primary only port is referred to as a "non-trunk" promiscuous port.

Alternatively, in the event that the port needs to be able to map many-secondaries-to-different-primaries, then an explicit table such as "Trunk Type Promiscuous Port VLAN Mapping Table" 550 as given in FIG. 5A may be employed to provide the required mapping. A port which maps many-secondaries-to-different-primaries is referred to as a "trunk" type promiscuous port. Turning now to FIG. 5A, column 552 holds an indicia of the Primary VLAN. Column 554 contains an indicia of the Secondary VLANs (either Isolated or Community VLANs) corresponding to the Primary VLAN.

For example, entries 560 refer to Primary VLAN number "2". Entries 570 refer to Primary VLAN number "3", etc.

Primary VLAN "2" is shown associated with: Secondary VLAN "20" at entry 560A; Secondary VLAN "21" at entry 560B; Secondary VLAN "22" at entry 560C; Secondary VLAN "23" at entry 560D, etc.

Further, Primary VLAN "3" is shown associated with: Secondary VLAN "30" at entry 570A; Secondary VLAN "31" at entry 570B; with Secondary VLAN "32" at entry 570C, etc. Entries 580, represented by "three dots" in both column 552 and 554, indicate that a further plurality of Primary VLANs may each be associated with its particular plurality of secondary VLANs by use of "Trunk Type Promiscuous Port VLAN Mapping Table" 550.

Figure 6:
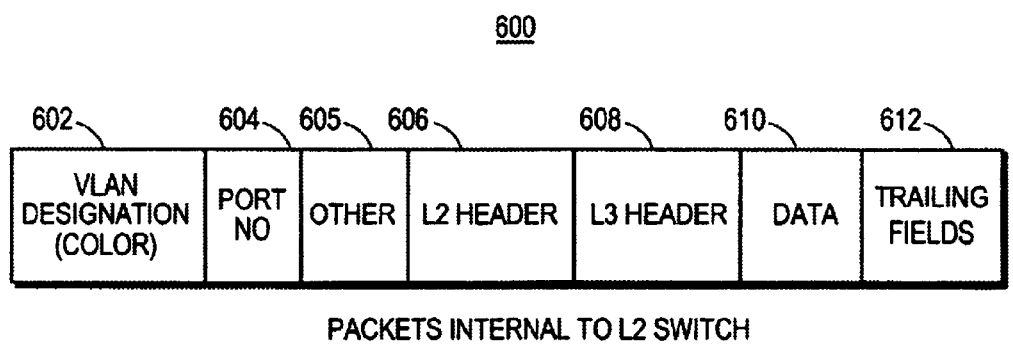
FIG. 6 is a field diagram of a VLAN packet internal to a L2 switch.

Turning now to FIG. 6, packet 600 is shown. Packet 600 is the VLAN packet travelling inside L2 switch 102. Fields of packet 600 are shown. Field 602 contains the VLAN designation to which the packet is transferred. VLAN designations are sometimes referred to as a "color", as is indicated in field 602. Field 604 contains the port number of the port designated to receive that particular packet. Field 605 contains any other fields carried by the packet as it travels through the internals of L2 switch 102.

When packet 600 represents a packet received at a promiscuous port, then field 604 contains the port number of the isolated port 204, 206, 208, . . . 214, etc., or community port 304, 306, . . . 314, etc., to which the packet is directed. The port circuitry reads field 604 and the correct port then receives the packet.

When packet 600 represents a packet received from an isolated or community port, the isolated or community VLAN number is written into field 602, and the port number of the promiscuous port designated to receive the packet is written into field 604.

When the receiving port is a community port, a distinction is made between unicast packets and broadcast packets. When the packet is a unicast packet, and in the rare event that the hardware has not yet learned the packet destination address, the packet is broadcast on the community ports so that the hardware can learn the address-port-association. Subsequent unicast packets to this particular community address are then forwarded out through the appropriate port.

In the alternative event that the incoming packet is a broadcast packet, the packet is replicated and forwarded out through each of the community ports of the community of designated ports.

Field 608 contains the L3 header of the underlying packet. Field 610 contains the data which is/was transmitted through the Internet. Field 612 contains the trailing fields of the underlying packet.

Turning now to FIG. 7, isolated or community port assignment table 700 is shown.

Isolated or community port assignment table 700 contains entries for directing a packet received from outside of switch 102 by an isolated or community port. Column 702 contains the isolated or community port number from which a packet is received, for example from a user LAN. Column 706 contains the designation of the isolated or community VLAN associated with that isolated or community port.

A typical entry 710 of isolated or community port assignment table 700 is shown. The isolated or community port number is found in field 712. The designation of the isolated or community VLAN associated with that isolated or community port is found in field 716.

During typical operation, a packet is received at an isolated or community port, port 114, 116, . . . 118, etc. from an external LAN connected to the port. A process in L2 switch 102 uses the port number at which the packet was received as an entry into table 700 at column 702, and finds the receiving port number in field 712. The process then reads the isolated or community VLAN to which the packet is to be transferred from field 716.

Figure 8:
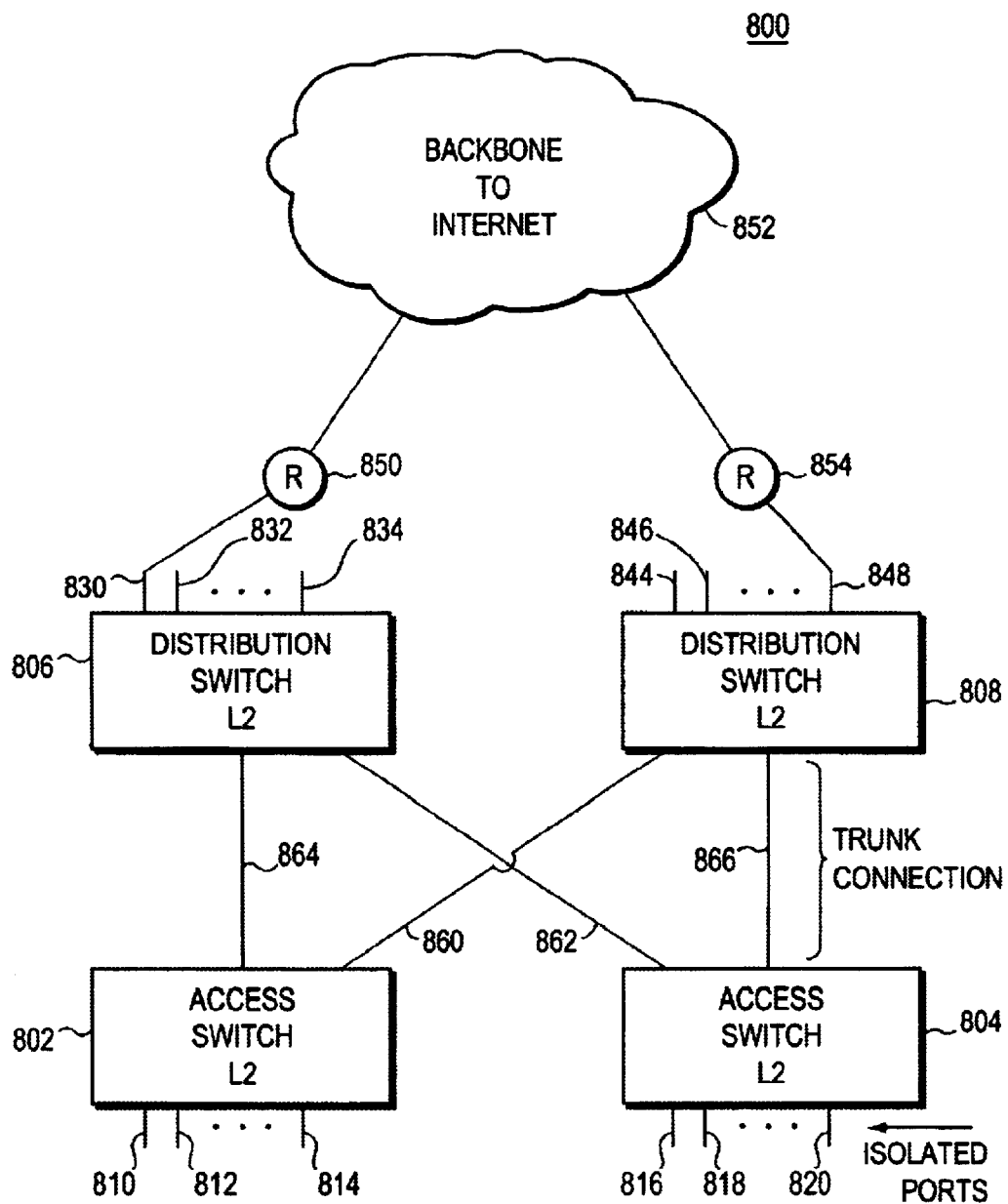
FIG. 8 is a block diagram of a two level layer 2-switch network in accordance with the invention.

Turning now to FIG. 8, computer network 800 is shown in an alternative embodiment of the invention. Access switch 802 and access switch 804 are typically L2 switches. Distribution switch 806 and distribution switch 808 are also both typically L2 switches. The access switches and the distribution switches are trunked together so as to share VLANs.

Computer network 800 has two layers of Layer 2 switching, the lower layer comprises access switch 802, and access switch 804. The higher, or second, level of Layer 2 switching in network 800 comprises distribution switch 806 and distribution switch 808. Typical Layer 2 switch trunk connections 860, 862, 864, and 866 are shown. Trunk connection 860 connects access switch 802 with distribution switch 808; trunk 862 connects access switch 804 with distribution switch 806; trunk connection 864 connects access switch 802 with distribution switch 806; and, trunk connection 866 connects access switch 804 with distribution switch 808. The trunk connections, 860, 862, 864, 866 are typical standard engineering practice trunk connections between Layer 2 switches. The trunk connections carry all of the VLANs interconnecting the access switches 802, 804 with the distribution switches 806, 808.

The two layers of Layer 2 switching, represented by the lower layer of access switches 802, 804 and the upper layer represented by distribution switches 806, 808, are a generalization of L2 switch 102. The two layer switching arrangement in network 800 at Layer 2 permits the implementation of more ports in the network so that a greater number of server users, for example, 122, 126, 132, etc. may be serviced by the system.

Access switch 802 has isolated or community ports 810, 812, ... 814, etc., and these isolated or community ports are analogous to isolated or community ports 114, 116, ... 118, etc. of L2 switch 102. Access switch 804 also has similar isolated or community ports 816, 818, ... 820, etc. The isolated or community ports are connected to external LANs which in turn connect to customer's servers, customer's other equipment, etc., as shown in FIG. 1.

Distribution switch 806 and distribution switch 808 have promiscuous ports connected to Layer 3 routers. Distribution switch 806 has promiscuous port 830, promiscuous port 832, ... promiscuous port 834, etc. Distribution switch 808 has promiscuous port 844, 846, ... 848, etc.

Trunk connections 860, 862, 864, 866, etc. carry the primary VLANs, the isolated VLANs, and the community VLANs interconnecting the promiscuous ports, the isolated ports, and the community ports.

Network 800 is analogous to L2 switch 102, in that the access switches 802, 804 provide the isolated or community ports, the distribution switches 806, 808 provide the promiscuous ports, and the trunk lines 860, 862, 864, 866 carry the necessary VLANs. Also, a further plurality of L2 switches may be trunked together as access switches to provide a desired number of ports for customer's equipment. Also, a further plurality of L2 switches may be trunked together as distribution switches to provide more connections to routers connecting to the Internet.

As an example, promiscuous port 830 of distribution switch 806 is shown connected to router 850. In turn, router 850 connects to network cloud 852, which is labeled "backbone to Internet". Network cloud 852 is typically a connection to the Internet, and alternatively represent the world wide Internet itself. Also, distribution switch 808 has port 848 shown connected, for example, to router 854. Router 854 also connects to network cloud 852. In operation, router 850 and router 854 connect the distribution layer switches 806, 808 to the Internet.

In the exemplary embodiment of the invention described above, the primary VLAN 230, 330 connects to all of the promiscuous ports, however in an alternative exemplary embodiments of the invention, a single primary VLAN may connect to only a subset of promiscuous ports. In such an alternative embodiment of the invention, there may be a plurality of primary VLANs, each with its associated promiscuous ports and associated isolated or community ports. Implementing a plurality of primary VLANs gives a system designer flexibility in arranging connections to L3/L4 devices through promiscuous ports, and to user equipment connected at isolated ports or community ports.

It is to be understood that the above described embodiments are simply illustrative of the principles of the invention. Various other modifications and changes may be made by those skilled in the art which embody the principles of the invention and fall within the spirit and scope thereof.

What is claimed is:

1. A method of implementing virtual local area networks (VLANs) in a switch in a computer network, comprising:
   establishing at least one promiscuous port, said promiscuous port receiving packets from an external circuit connected to said promiscuous port;
   transferring a packet by a first VLAN within said switch from said at least one promiscuous port to a plurality of isolated ports, and only a selected isolated port receiving said packet; and
   transferring packets by a second VLAN from said plurality of isolated ports to said plurality of promiscuous ports, said second VLAN configured so that a packet transferred to said second VLAN by a first isolated port cannot be received and retransmitted by a second isolated port.

2. The method as in claim 1 further comprising:
   directing a first user's packets, said first user's packets received by a first isolated port assigned to said first user, from an external circuit connected to said first isolated port, to a selected promiscuous port by said isolated VLAN, and preventing any other isolated port from receiving said first user's packets from said isolated VLAN.

3. The method as in claim 1 further comprising:
   transferring a packet by a community VLAN from a community port to both said plurality of promiscuous ports, and to all other community ports connected to said community VLAN, but not to any other isolated ports or community ports.

4. A method of implementing virtual local area networks (VLANs) in a switch in a computer network, comprising:
   transferring first packets by a first VLAN from at least one promiscuous port to a plurality of isolated ports, said at least one promiscuous port receiving said first packets from an external circuit connected to said at least one promiscuous port, each of said isolated ports detecting a packet addressed to a selected isolated port, and only said selected isolated port receiving said packet; and
   transferring second packets by a second VLAN from said plurality of isolated ports to said at least one promiscuous port, a selected isolated port of said plurality of isolated ports receiving said second packets from an external circuit connected to said selected isolated port, said second VLAN configured so that a packet transferred to said second VLAN by a first isolated port cannot be received and retransmitted by a second isolated port.

5. The method as in claim 4 further comprising:
   directing a first user's packets, said first user's packets received by a first isolated port assigned to said first user from an external circuit connected to said first isolated port, to a selected promiscuous port by said second VLAN, and preventing any other isolated port from receiving said first user's packets from said second VLAN.

6. A switch, comprising:
   a promiscuous port for receiving incoming packets from an external network, and for transmitting outgoing packets to said external network; and a plurality of isolated ports, a selected isolated port of said plurality of isolated ports connected to a selected private network, said selected isolated port receiving packets from said selected private network and transmitting packets onto said selected private network, said selected isolated port exchanging packets with said promiscuous port through a path inside said switch, and said isolated port not exchanging packets with another isolated port.

7. The switch of claim 6 further comprising:

a plurality of community ports, each of said community ports of said plurality of community ports receiving packets from a selected external network and transmitting packets onto said selected external network, each port of said community of ports exchanging packets through a path internal to said switch with said promiscuous port, and said each port of said community of ports exchanging packets with all ports of said plurality of community ports through a path within said switch, and said each port of said community of ports not exchanging packets with any other port of said switch through a path within said switch.

8. The switch of claim 6 further comprising:

a plurality of virtual local area networks (VLANS) implemented inside said switch;

a first VLAN of said plurality of VLANs designated as a primary VLAN, said primary VLAN carrying packets from said promiscuous port to said plurality of isolated ports, and only a designated isolated port receiving said packet; and a second VLAN of said plurality of VLANs designated as an isolated VLAN, said isolated VLAN carrying packets from said plurality of isolated ports to said promiscuous port.

9. The switch as in claim 8 further comprising:

a plurality of community ports; and a third VLAN of said plurality of VLANs designated as a community VLAN, said community VLAN carrying packets received from each community port of said plurality of community ports to said promiscuous port, and said community VLAN carrying said community packets to each community port of said plurality of community ports, but not carrying said community packets to any other port of said switch.

10. The switch of claim 6 further comprising: said switch is a layer 2 switch.

11. A switch in a computer network, comprising means for implementing a plurality of virtual local area networks (VLANs) in said switch, comprising:

means for establishing at least one promiscuous port, said promiscuous port receiving packets from an external circuit connected to said promiscuous port; p1 means for transferring a packet by a first VLAN of said plurality of VLANs from said at least one promiscuous port to a plurality of isolated ports, and only a selected isolated port receiving said packet; and means for transferring packets by a second VLAN of said plurality of VLANs from said plurality of isolated ports to said plurality of promiscuous ports, said second VLAN configured so that a packet transferred to said second VLAN by a first isolated port cannot be received and retransmitted by a second isolated port.

12. The switch of claim 11, further comprising:

means for directing a first user's packets, said first user's packets received by a first isolated port assigned to said first user, from an external circuit connected to said first isolated port, to a selected promiscuous port by said isolated VLAN, and preventing any other isolated port from receiving said first user's packets from said isolated VLAN.

13. The switch of claim 11, further comprising:

means for transferring a packet by a community VLAN from a community port to both said plurality of promiscuous ports, and to all other community ports connected to said community VLAN, but not to any other port of said switch.

14. A computer readable media containing instructions for a computer for executing the method of claim 1, or claim 4.

15. Signals on a computer network, said signals readable by a computer, said signals carrying instructions for executing the method of claim 1, or claim 4.

16. A method of implementing virtual local area networks (VLANs) in a switch in a computer network, comprising:

receiving, by at least one promiscuous port, packets from an external circuit connected to said promiscuous port;

transferring packets by a first VLAN from said at least one promiscuous port to a plurality of isolated ports, and only a selected isolated port receiving said packet; and transferring packets by a second VLAN from said plurality of isolated ports to said plurality of promiscuous ports, said second VLAN configured so that a packet transferred to said second VLAN by a first isolated port cannot be received and retransmitted by a second isolated port.

17. A method of implementing virtual local area networks (VLANs) in a switch in a computer network, comprising:

receiving a user's packet, by a first isolated port assigned to said user, said packet received from an external circuit connected to said first isolated port; and transferring said packet by an isolated VLAN to a selected promiscuous port to be transferred to an external circuit connected to said promiscuous port, said isolated VLAN configured as a one way connection from all isolated ports to all promiscuous ports and also configured to prevent any other isolated port from receiving said user's packets from said isolated VLAN, said all promiscuous ports also connected via a one way primary VLAN to said all isolated ports.

18. A method of implementing virtual local area networks (VLANs) in a switch in a computer network, comprising:

receiving a user's packet, by a first community port assigned to said user, said packet received from an external circuit connected to said first community port; and transferring said packet by a community VLAN to both a plurality of promiscuous ports connected to external circuits, and to all other community ports connected to said community VLAN, but not to any other ports of said switch, said community VLAN configured as a one way connection from all community ports in said community VLAN to all promiscuous ports said all promiscuous ports also connected via a one way primary VLAN to all community ports.

19. A switch implementing virtual local area networks (VLANs) in a computer network, comprising:

at least one first promiscuous port to receive packets from an external circuit connected to said promiscuous port;

a plurality of isolated ports to receive packets through a first VLAN from said at least one promiscuous port, and only a selected isolated port receiving said packet; and at least one second promiscuous port to receive packets through a second VLAN from said plurality of isolated ports, said second VLAN configured so that a packet received through said second VLAN by a first isolated port cannot be received and retransmitted by a second isolated port.

20. A switch implementing virtual local area networks (VLANs) in a computer network, comprising:

a first isolated port assigned to a user to receive said user's packet from an external circuit connected to said first isolated port; and a selected promiscuous port to receive said packet through an isolated VLAN, said packet to be transferred to an external circuit connected to said promiscuous port, said isolated VLAN configured as a one way connection from all isolated ports to all promiscuous ports and also configured to prevent any other isolated port from receiving said user's packets from said isolated VLAN, said all promiscuous ports also connected via a one way primary VLAN to said all isolated ports.

21. A switch implementing virtual local area networks (VLANs) in a computer network, comprising:

a plurality of community ports, including a first community port assigned to a user to receive said user's packet from an external circuit connected to said first community port; and a plurality of promiscuous ports connected to external circuits to receive said packet through a community VLAN, all other community ports connected to said community VLAN also receiving said packet, but not any other ports of said switch, said community VLAN configured as a one way connection from all community ports in said community VLAN to all promiscuous ports, said all promiscuous ports also connected via a one way primary VLAN to all community ports.

22. A switch implementing virtual local area networks (VLANs) in a computer network, comprising:

means for receiving, by at least one promiscuous port, packets from an external circuit connected to said promiscuous port;

means for transferring packets by a first VLAN from said at least one promiscuous port to a plurality of isolated ports, and only a selected isolated port receiving said packet; and means for transferring packets by a second VLAN from said plurality of isolated ports to said plurality of promiscuous ports, said second VLAN configured so that a packet transferred to said second VLAN by a first isolated port cannot be received and retransmitted by a second isolated port.

23. A switch implementing virtual local area networks (VLANs) in a computer network, comprising:

means for receiving a user's packet, by a first isolated port assigned to said user, said packet received from an external circuit connected to said first isolated port; and means for transferring said packet by an isolated VLAN to a selected promiscuous port to be transferred to an external circuit connected to said promiscuous port, said isolated VLAN configured as a one way connection from all isolated ports to all promiscuous ports and also configured to prevent any other isolated port from receiving said user's packets from said isolated VLAN, said all promiscuous ports also connected via a one way primary VLAN to said all isolated ports.

24. A switch implementing virtual local area networks (VLANs) in a computer network, comprising:

means for receiving a user's packet, by a first community port assigned to said user, said packet received from an external circuit connected to said first community port; and means for transferring said packet by a community VLAN to both a plurality of promiscuous ports connected to external circuits, and to all other community ports connected to said community VLAN, but not to any other ports of said switch, said community VLAN configured as a one way connection from all community ports in said community VLAN to all promiscuous ports, said all promiscuous ports also connected via a one way primary VLAN to all community ports.

25. A computer-readable media, comprising: said computer-readable media containing instructions for execution in a processor for the practice of the method of claim 16, or claim 17, or claim 18.

26. Electromagnetic signals propagating on a computer network, comprising: said electromagnetic signals carrying instructions for execution on a processor for the practice of the method of claim 16, or claim 17, or claim 18.

* * * * *